Aug. 25, 1970 S. DEINESS 3,525,150

METHOD OF PREPARING A SUPERCONDUCTING MATERIAL

Filed Jan. 4, 1967 2 Sheets-Sheet 2

INVENTOR.
SERGE DEINESS

BY Frank R. Trifari
AGENT

METHOD OF PREPARING A SUPERCONDUCTING MATERIAL

Filed Jan. 4, 1967 2 Sheets-Sheet 1

INVENTOR.
SERGE DEINESS
BY
AGENT

United States Patent Office 3,525,150
Patented Aug. 25, 1970

3,525,150

METHOD OF PREPARING A SUPERCONDUCTING MATERIAL

Serge Deiness, Ernestine-Versailles, France, assignor, by mesne assignments, to U.S. Philips Corporation, New York, N.Y., a corporation of Delaware Filed Jan. 4, 1967, Ser. No. 607,277
Claims priority, application France, Jan. 5, 1966, 44,909; Dec. 16, 1966, 87,719
Int. Cl. H01v *11/00*
U.S. Cl. 29—599 2 Claims

ABSTRACT OF THE DISCLOSURE

A method of preparing superconducting $Nb_3Sn$ by reacting Nb and Sn at a temperature of 800–1000° C. in contact with Ni.

Figure 4:
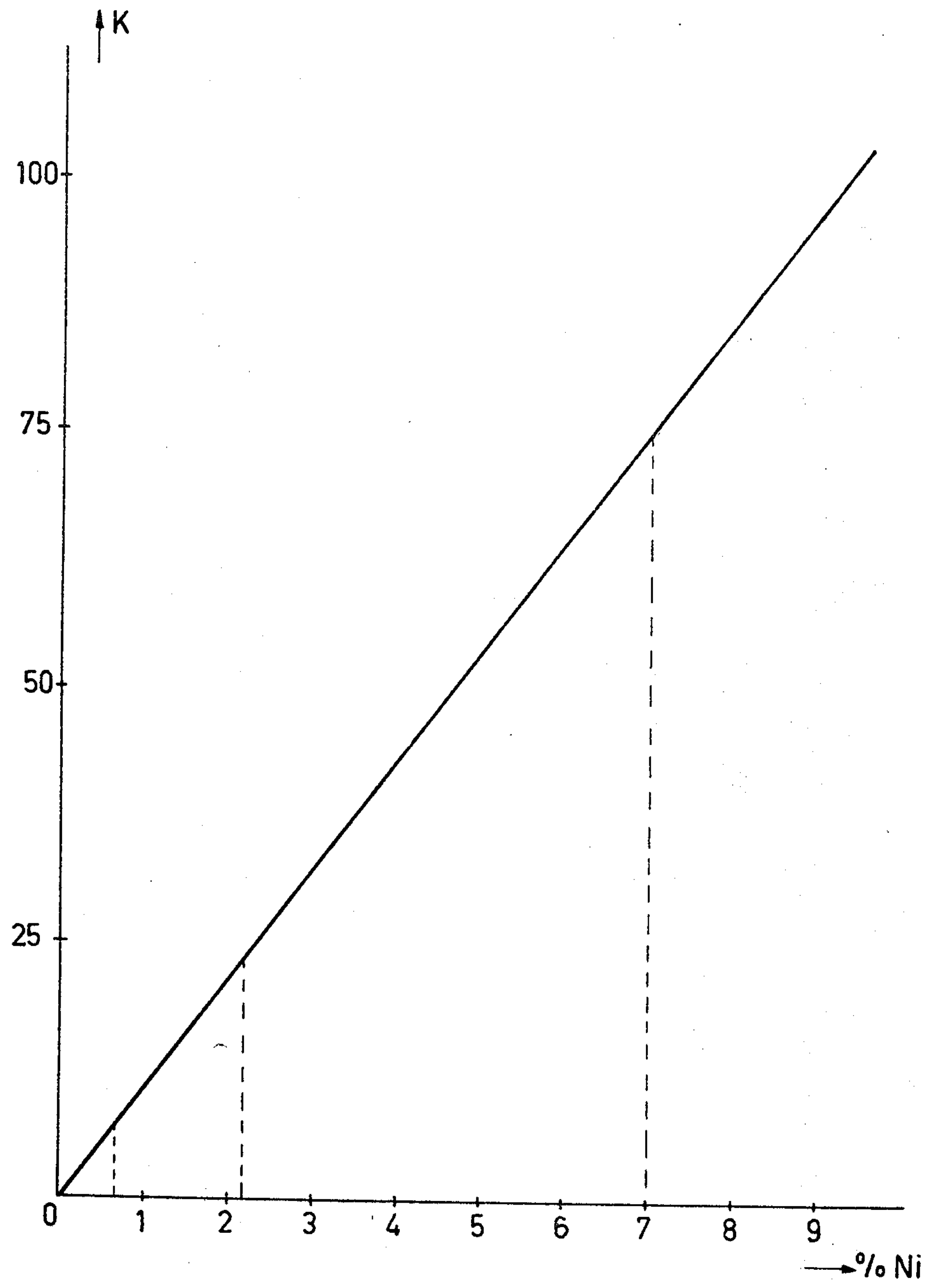

The present invention relates to a method of preparing a superconducting material which contains the compound $Nb_3Sn$ as the active constituent.

The superconducting properties of $Nb_3Sn$ are known. $Nb_3Sn$ has a high critical magnetic field strength and a high value of the critical current at a critical temperature of 18° K.

Unfortunately, the possibilities of processing said material are restricted as a result of its particular brittleness. The treatment in manufacturing bodies from this material must be effected very carefully. Long thermal treatments at high temperatures are required.

It has already been proposed, for example, for the manufacture of a superconducting wire having $Nb_3Sn$ as the active constituent, to subject a tube which is filled with a mixture of niobium and tin in powder form to a mechanical reduction treatment succeeded by a thermal treatment at a temperature between 800 and 1500° C. for a period of time between 5 and 25 hours.

Some improvement has been achieved by using as the starting material a powder having a smaller grain size which resulted in the treatment time being reduced to approximately 1 hour.

Since the required treatment time is long it is necessary to use a sheath which forms a good diffusion barrier in order to avoid contamination of the $Nb_3Sn$. As a material for this sheath is usually used niobium which has the drawback that the elongation of such a wire is laborious and difficult. In addition niobium is expensive.

The invention provides a new method of preparing $Nb_3Sn$ which has very good superconducting properties and the manufacturing conditions of which are highly improved.

According to the invention, the method of preparing a superconducting material which contains the compound $Nb_3Sn$ as the active constituent—the $Nb_3Sn$ having been obtained by heating a metallic mixture of starting materials containing niobium and tin, respectively, at a temperature between 800 and 1000° C.—is characterized in that during the reaction the mixture of starting materials is contacted with nickel.

According to a preferred embodiment the known method is used according to which the mixture of niobium and tin is contained in a sheath which is drawn to the desired diameter and, if required, wound to form a coil before heating is carried out to form the compound $Nb_3Sn$, the sheath according to the invention consisting of nickel or an Ni-alloy.

A different embodiment of the process according to the invention consists of adding to the starting mixture of niobium and tin powdered nickel in a quantity between 0.1 and 15% by weight.

In evaluating the superconducting properties of a material it is particularly the critical current strength that is of importance. The critical current strength is to be understood to mean herein the maximum value of the current which can flow through the material without said material getting out of the superconducting state. For a wire having given dimensions said critical current strength ($I_c$) depends upon the magnetic field strength (H) in the wire. To an approximation it holds for the compound $Nb_3Sn$ that the product $H \times I_c$ is constant. Samples of the material are evaluated for the measured value of the product $H \times I_c$ in which H is expressed in k.gauss and I in amp.

Figure 1:
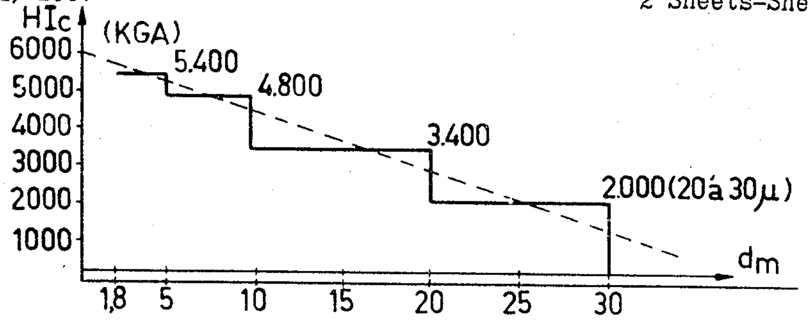
Figure 2:
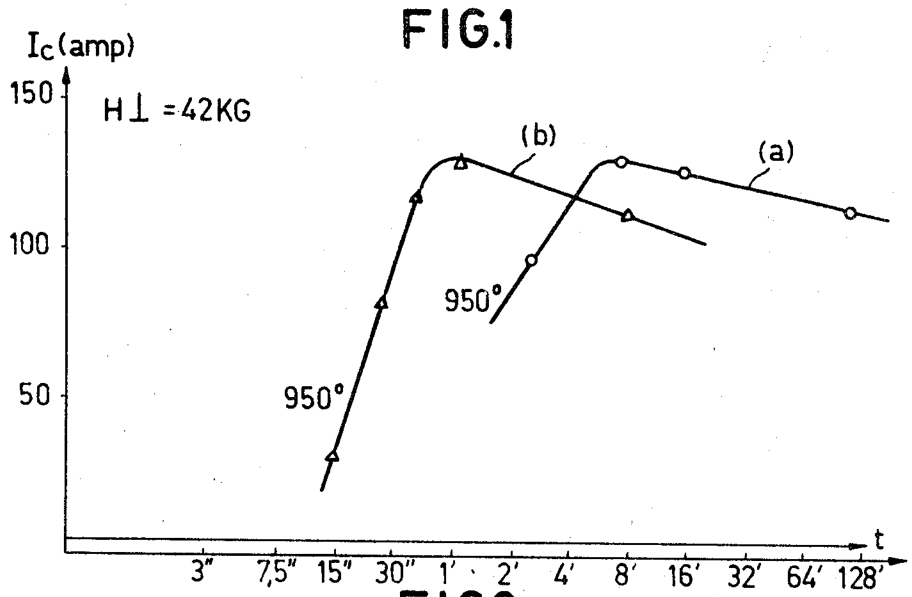

In order that the invention may readily be carried into effect, it will now be described in greater detail, by way of example, with reference to the drawings, in which FIG. 1 is a graph in which the resulting values of the product $HI_c$ are shown dependent upon the grain size of the powder without further additions, FIG. 2 shows curves which represent the relationship between the current-conveying power and the duration ($t$ in sec.) of the termal treatment used at 950–955° C.: $I_c=f(t)$ of wire obtained from powder having a grain size of from 2 to 5 microns, with a niobium sheath (curve *a*) and with a nickel sheath (curve *b*).

Figure 3:
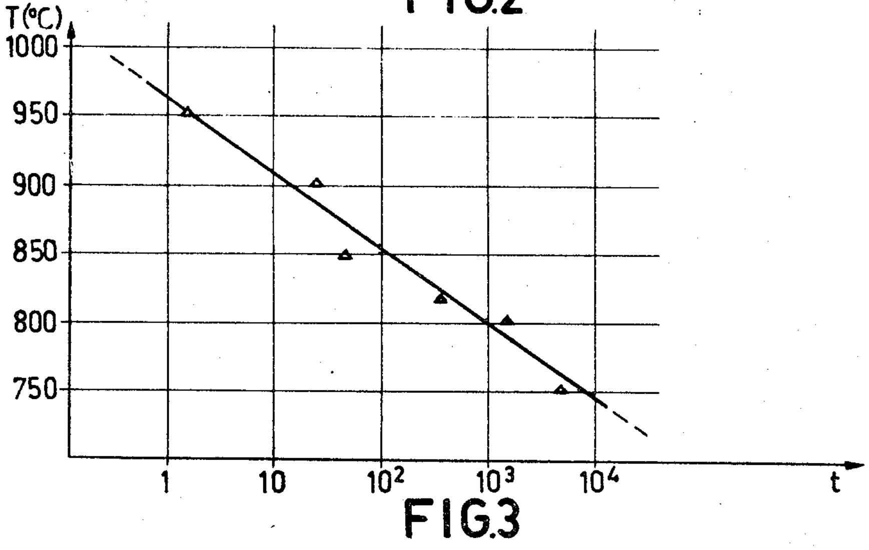

FIG. 3 is a graph which shows the relationship between the duration of the thermal treatment and the temperature chosen (T) for a maximum value of the product $HI_c$ for a wire having a sheath consisting of nickel and an inside diameter of 72 microns, the grain size of the starting material being from 2 to 5 microns, FIG. 4 shows a graph in which the product $HI_c$ and the maximal current-density have been plotted as a function of the quantity of nickel added to a mixture of niobium and tin at an optimal time of treatment at 900° C.

The example relates to superconducting $Nb_3Sn$-wire with which in particular coils can be manufactured. Of course, the method according to the invention may be used for the manufacture of any other device using $Nb_3Sn$ in which niobium and tin in the pure form or as compounds are used as the starting materials.

As already stated above a method is known according to which a tube, usually consisting of niobium, is filled with powdered niobium and tin, the tin being present in deficiency relative to the stoichiometric ratio 3Nb+Sn, after which the tube is subjected to a mechanical reduction treatment before the thermal treatment is carried out.

If a mixture of niobium and tin in powder form is allowed to react and the layer thickness of the $Nb_3Sn$ formed on the surface of the grains is measured at various heating times, it is found that said layer thickness reaches 5 microns rather soon, is only 8 microns, however, after heating for one hour and that said thickness has not yet exceeded 10 microns after heating for 8 hours. Apparently the niobium-tin forms a substantially perfect diffusion barrier in said layer thickness. There exists an optimum heating duration for the grain size with which a maximum current density is achieved.

This is diagrammatically shown in the FIGS. 1 and 2 for a wire having a niobium sheath, inside diameter 240 microns. From this graph it may be seen that, for example, with a fine powder having a grain diameter between 2 and 5 microns, a value of the product $HI_c$ of 6000 kg. can be obtained by carrying out the thermal treatment at 950° C. for approximately 10 minutes. It may be seen from FIG. 2 that the circumstances of the treatment are rather critical.

A higher value of the ratio between the surface of the niobium grains and the inner surface of the sheath increases the reaction speed and enables the use of a sheath material which is more reactive with respect to tin. This involves, however, many advantages, notably economic advantages, as will be explained below.

EXAMPLE 1

A sheath consisting of Ni, purity approximately 99.5% is filled with a mixture of niobium powder and tin powder. The required heating duration is approximately one tenth of that which is required if a niobium sheath is used, while the resulting critical current density of the final product is substatnially equal. For powder having a grain size between 2 and 5 microns, a sheath having an inside diameter of 270 microns and a ratio between the grain surface and the inner surface of the sheath of more than 100, the duration of treatment at 950° C. is less than 40 seconds (FIG. 2, curve *b*) with a nickel sheath.

Equally good or even better results in less critical circumstances of treatment are obtained when using a lower temperature which may be reduced to 850° C., the duration of treatment increasing to 30 minutes. This enables the treatment to be adapted to the circumstances chosen, for example, a very short treatment in a transit furnace or a longer treatment when heating is carried out batchwise.

In FIG. 3 the temperature at which the thermal treatment is carried out is plotted against the duration of the treatment for a wire employing a nickel sheath having an inside diameter of 220 microns, and for powder having a grain size between 2 and 5 microns. Of course, the results are somewhat different when the grain size of the powder is different (for example smaller than 15 microns) or the inside diameter of the sheath is different,

EXAMPLE 2

To a mixture of Nb and Sn powder is added powdered nickel in a small quantity (for example, 0.7 at. percent) in a pure form or as an alloy, for example Ni-Sn or Ni-Nb. A metal sheath is filled with this mixture. The results are substantially equal to those of the preceding example.

The nickel plays the part of a catalyst in the reaction. Owing to the better circumstances of the required treatment, the sheath may be chosen of a material other than niobium on the one hand as a result of the use of fine powder, on the other hand as a result of the presence of nickel, so that the following advantages are obtained: Lower cost price of the wire, more easy to obtain as long tubes, good ductility, temperable under easier conditions, better lubrication of the wires and higher tensile strength. On the other hand, as regards the superconducting properties the advantage exists of a higher electric and thermal conductivity of the sheath which results in a more favourable behaviour at high current densities and varying current density and facilitates a connection through the lower resistance.

In these circumstances $Nb_3Sn$ is obtained which has excellent superconducting properties and the manufacturing cost of which is considerably lower than so far.

The use of Ni as a material for the sheath likewise is interesting because as a result of this the addition thereof in another form is superfluous.

It is to be noted that for the manufacture of thicker wire, or if obtaining maximum current densities is not aimed at, the importance of a small grain size of the powder is not so great. For example, with a nickel sheath a powder may successfully be used the fraction of the grains of which, which have dimensions smaller than 15 microns is at least 50%.

Nickel in a form such that it diffuses through other metals may be used as a carrier for simultaneously providing the two elements, the nickel increasing the reaction speed.

Alternatively, in an arbitrary sheath, for example, nickel wires together with niobium and tin may be elongated in suitable ratios.

Nickel may also be used in a method according to which niobium tape or wire is tin-plated to obtain $Nb_3Sn$; only approximately 0.05% Ni is required to achieve already a noticeable acceleration of the reaction. Alternatively, the starting material may be a nickel wire or tape on which niobium is deposited before the assembly is passed through a molten tin bath at the reaction temperature.

EXAMPLE 3

Superconductive wire is produced, use being made of starting material consisting of a mixture of powdered niobium and tin in an weight-ratio of 74:26, which varying quantities of powdered nickel are added to and which mixture is brought into a tube of niobium. Preferably the average particle-size of the nickel-powder is chosen of about the same value as that of the niobium-tin-mixture, e.g. a diameter not exceeding 15$\mu$ and preferably an average diameter betwen 2 and 5$\mu$.

The wire, obtained by this process, is drawn into the desired diameter and subsequently it is subjected to a thermal treatment at a temperature of 900° C. during optimal times. In the present example these treatment-times for additions of nickel-powder of 0–0.22—0.7–2.2 and 7% by weight respectively: 2 hrs., 1 hr., 20 min., 10 min. and 30 sec.

Applying a sheath having an internal diameter of 240$\mu$, an addition of 1% of Ni approximately corresponds, with regard to the final result and the duration of treatment, with an internal wall of a sheath consisting of nickel, the mixture in the sheath having no further addition.

For a quantity of added nickel between 0.05 and 3% by weight and a temperature of treatment of 900° C. the obtained wire possesses a value $HI_c$ between 6000 and 6500 kg.

FIG. 4 shows a graph in which the ratio of the heating times, i.e. the acceleration-factor of the reaction (K) have been plotted as a function of the quantity of nickel added to the mixture of Nb and Sn.

What is claimed is:

1. A method of preparing a superconducting material essentially consisting of $Nb_3Sn$ which method comprises heating a mixture of niobium and tin containing materials in the presence of nickel at a temperature of between 800° C. and 1000° C.

2. The method of claim 1 wherein the mixture of tin and niobium is enclosed in a sheath consisting of nickel or a nickel-containing alloy.

References Cited

UNITED STATES PATENTS

| | | | |
|---|---|---|---|
| 936,403 | 10/1909 | Von Bolton | 29—191.2 X |
| 2,888,740 | 6/1959 | Davis | 29—191.2 |
| 3,124,455 | 3/1964 | Buehler et al. | 75—174 X |
| 3,167,692 | 1/1965 | Matthias. | |
| 3,269,806 | 8/1966 | Fitzer et al. | 29—191.2 X |
| 3,290,186 | 12/1966 | Rosi et al. | 75—174 X |
| 3,351,437 | 11/1967 | Swartz et al. | 75—174 X |
| 3,379,000 | 4/1968 | Webber et al. | 29—193 X |

PAUL M. COHEN, Primary Examiner

U.S. Cl. X.R.

29—191.2, 193

PO-1050
(5/69)

UNITED STATES PATENT OFFICE
CERTIFICATE OF CORRECTION

Patent No. 3,525,150 (PHN 1944) Dated August 25, 1970

Inventor(s) SERGE DEINESS

It is certified that error appears in the above-identified patent and that said Letters Patent are hereby corrected as shown below:

Col. 1, line 47, after "sheath" insert -- there --.
line 58, cancel "respectively".
line 61, change "contacted" to -- in contact --.
line 67, change "Ni" to -- nickel --.

Col. 2, line 7, change "To" to -- For --.
line 43, change "deficiency" to -- a deficient amount --.
line 50, after "soon" insert -- but --.
line 56, after "duration" insert -- time --.
line 59, change "sheath," to -- sheath and an inside --.
line 71, change "however" to -- moreover --.

Col. 3, line 2, change "Ni" to -- niobium --.
lines 54-56, cancel and rewrite as follows:
-- Under these conditions the $Nb_3Sn$ obtained has excellent superconducting properties and at a manufacturing cost which is considerably less than that of the previously employed methods --.
lines 64-66, change "used the fraction of the grains of which, which have dimensions smaller than 15 microns is at least 50%" to -- employed in which at least 50% of the grains have dimensions less than 15 microns --.

Col. 4, lines 3-5, cancel and rewrite as follows:
-- Alternatively, wires may be formed by elongating a nickel sheath filled with niobium and tin in suitable ratios. --
line 8, cancel "only";
after "approximately" insert -- only --.
lines 8 and 9, cancel "already".

PO-1050
(5/69)

UNITED STATES PATENT OFFICE
CERTIFICATE OF CORRECTION

Patent No. 3,525,150 (PHN 1944) Dated ____________

Inventor(s) ____________

It is certified that error appears in the above-identified patent and that said Letters Patent are hereby corrected as shown below:

Col. 4, line 15, after "of" insert -- a --.
line 17, after "26" insert -- to --.
line 18, cancel "to".
lines 27 and 28, change "during optimal times" to -- for optimal periods --.
line 28, change "treatment times" to -- optimal periods --.
line 30, after "weight" insert -- are --.
line 32, change "Applying" to -- Employing --.

Signed and sealed this 30th day of March 1971.

(SEAL)
Attest:

EDWARD M.FLETCHER,JR.
Attesting Officer

WILLIAM E. SCHUYLER, JR.
Commissioner of Patents